United States Patent [19]
Kido et al.

[11] Patent Number: 5,984,002
[45] Date of Patent: Nov. 16, 1999

[54] TEMPERATURE AND HUMIDITY CONTROL APPARATUS AND TEMPERATURE AND HUMIDITY PREDICTION APPARATUS USED THEREFOR

[75] Inventors: Kazuhiro Kido; Masaya Shimoji; Nakamasa Satoh, all of Hino, Japan

[73] Assignee: Konica Corporation, Tokyo, Japan

[21] Appl. No.: 08/520,602

[22] Filed: Aug. 29, 1995

[30] Foreign Application Priority Data

Sep. 1, 1994 [JP] Japan ................................ 6-208662

[51] Int. Cl.$^6$ .................................................. F25B 29/00
[52] U.S. Cl. ........................ 165/228; 236/44 C; 165/229; 165/230; 165/224; 62/90
[58] Field of Search ................................... 165/228, 229, 165/230, 224; 62/90; 236/44 C

[56] References Cited

U.S. PATENT DOCUMENTS

| | | | |
|---|---|---|---|
| 4,750,545 | 6/1988 | Hile et al. ................................. | 165/228 |
| 4,813,474 | 3/1989 | Umezu ..................................... | 165/228 |
| 4,932,588 | 6/1990 | Fedter et al. ............................ | 165/230 |

FOREIGN PATENT DOCUMENTS 1-181112  7/1989  Japan .

OTHER PUBLICATIONS

Shekar et al., "Dynamic Study of a Chill Water Cooling and Dehumidifying Coil", Paper No. 2141, Ashrae Annual Meeting, Kansas City, MO, Jun. 28–Jul. 1, 1970, pp. 36–51.

Kano, H. "Discrete System Approximate Model of the Distribution Constant System"; Measurement and Control, vol. 19–11, 1980; pp. 1044–1050.

*Primary Examiner*—John K. Ford
*Attorney, Agent, or Firm*—Finnegan, Henderson, Farabow, Garrett & Dunner, L.L.P.

[57] ABSTRACT

A temperature and humidity control apparatus includes a humidity control section for controlling humidity when a flow rate of a low temperature fluid in a cooling dehumidifier composed of a heat exchanger is determined; a heater control section for controlling temperature when a flow rate of a high temperature fluid in a heater; and a predicting device for predicting an amount of temperature change caused by an operation of the cooling dehumidifier. The amount of predicted temperature change is canceled when the flow rate of the high temperature fluid in the heater is determined in the heater control section, and the flow rate of the high temperature fluid in the heater is determined so that the setting temperature can be realized.

9 Claims, 4 Drawing Sheets

TEMPERATURE AND HUMIDITY CONTROL APPARATUS AND TEMPERATURE AND HUMIDITY PREDICTION APPARATUS USED THEREFOR

BACKGROUND OF THE INVENTION

The present invention relates to a temperature and humidity control apparatus in an air-conditioning system used for drying photosensitive materials and also used for general purposes.

Conventionally, the following temperature and humidity control methods are used for controlling the temperature and relative humidity in a workshop to be accurately constant.

(1) One method is described as follows. Temperature control is conducted independently from humidity control, wherein temperature control is conducted by a cooling dehumidifier and a heater, and humidity control is conducted by a cooling dehumidifier and a humidifier. When cooling is temporarily conducted by the temperature control and dehumidification is conducted by humidity control, a larger opening is adopted for the cooling dehumidifier.

(2) Another method is described as follows. After temperature and humidity have been temporarily controlled lower than the set values using a cooling dehumidifier, temperature is controlled by a heater, and humidity is controlled by a humidifier.

(3) Still another method is described as follows. The opening of a cooling dehumidifier is added to the opening of a heater and also added to the opening of a humidifier, and an amount of forward control corresponding to the entrance temperature and humidity is added to each opening (disclosed in Japanese Patent Publication Open to Public Inspection No. 181112/1989).

Temperature and humidity of the discharge side air of a heat exchanger, which are used when the control system of the heat exchanger is designed, are expressed as follows.

(4) A heat exchanger is divided into a finite number of portions, and the temperature of the discharge side air is expressed in accordance with the heat balance in each portion, which is disclosed in the thesis written by Hideaki Kano, the title of which is "Discrete System Approximate Model of the Distribution Constant System" in the magazine of "Measurement and Control" vol. 19–11, 1044/1050 published in 1980.

(5) Still another method is described as follows. A heat exchanger used as a cooling dehumidifier is divided into a finite number of portions. In accordance with the heat balance and the material balance in each portion, the temperature and humidity of the discharge side air are simultaneously expressed when the humidity close to a heating surface is given to a model, which is disclosed in the thesis "S. Chandra Sheker and G. Green, Dynamic Study of a Chill Water Cooling and Dehumidifying Coil, ASHRAE TRANSACTIONS, 76–3141, 36/51 (6,1970)".

Five methods are described above, however, however, each method has a disadvantage, which will be described as follows.

In the case of method (1), when the temperature and humidity setting is in a condition of cooling and dehumidifying, either the control of temperature or the control of humidity is neglected, so that the control deviation is increased.

In the case of method (2), after air has been unnecessarily cooled and humidified, it is heated and humidified again. Therefore, energy is wasted, and this method is not economical.

FIG. 6 is a graph showing a state of control of temperature and humidity in the case of method (3). FIG. 7 is a graph showing the changes of an amount of high temperature fluid in the heater, an amount of low temperature fluid in the cooling dehumidifier, and an amount of steam in the humidifier.

In the case of method (3), the following problems may be encountered. According to FIGS. 6 and 7, in order to cancel an amount of cooling conducted by the cooling dehumidifier, the opening of the cooling dehumidifier is added to the opening of the heater, however, the effect provided by a simple addition is not so high due to a difference between the cooling dehumidifier and the heater and also due to a difference between the low and high temperature fluids. Therefore, an adjustment of trial and error is conducted in this method. Concerning the addition of an amount of feed forward control corresponding to the entrance temperature and humidity, the circumstances are the same as those described above. Even after the adjustment conducted in the manner of trial and error, there is a possibility that the temperatures of the low and high temperature fluids fluctuate. In this case, it is impossible to provide a sufficiently high accuracy.

In the case of method (4), only a change in temperature at an outlet of the heat exchanger is expressed, and simultaneous changes in the temperature and humidity are not expressed.

In the case of method (5), simultaneous changes in the temperature and humidity in the cooling dehumidifier are expressed by the Lewis Number, which is a constant, and humidity Wf, which is a humidity at a position close to the surface of heat transfer tube, wherein Wf changes in accordance with a wet condition on the surface of heat transfer tube. The Lewis Number is a constant at all times, however, the value of Wf changes in accordance with a wet condition of the surface of the heat transfer tube portion between air and low temperature fluid when the humidity of the entrance portion is changed. Further, it is necessary to change the value of Wf in accordance with a flow amount region to be used for each row. Therefore, it is difficult to use this method when the entrance humidity is frequently changed or the flow amount is changed. Further, it is necessary to respectively find a film coefficient of heat transfer on the air side, a coefficient of heat-transfer of the heat transfer tube portion between air and low temperature fluid, and a film coefficient of heat transfer on the low temperature fluid side. In order to find the above coefficients, it is necessary to arrange temperature sensors to measure the temperature distribution in the cooling dehumidifier.

Due to the foregoing, it can be said that the temperature and humidity are difficult to be predicted under the various temperature and humidity conditions, using the prediction apparatus of (4) and (5).

SUMMARY OF THE INVENTION

The present invention has been accomplished to solve the above problems. It is an object of the present invention to provide a temperature and humidity control apparatus in which energy can be economized and the control deviation is small.

The first embodiment for accomplishing the object of the present invention comprises: a humidity control section (a cooling dehumidification control section for dehumidification use) for controlling the humidity when a flow rate of the low temperature fluid in the cooling dehumidifier composed of a heat exchanger is determined; a heater control section for controlling the temperature when a flow rate of the high temperature fluid in the heater is determined; and a predicting means for predicting an amount of temperature change caused by the operation of the cooling dehumidifier, wherein the amount of predicted temperature change is canceled when the flow rate of the high temperature fluid in the heater is determined in the heater control section, and the flow rate of the high temperature fluid in the heater is determined so that the setting temperature can be realized.

In addition to the first embodiment described above, using a model into which the entrance side air temperature and humidity of the cooling dehumidifier, the temperature of the low temperature fluid, and the discharge side air temperature and humidity with respect to the flow rate of the low temperature fluid of the cooling dehumidifier are incorporated, a flow rate of the low temperature fluid to realize the setting humidity is determined.

In addition to the first embodiment described above, using a model into which the entrance side air temperature and humidity of the cooling dehumidifier, and the discharge side air temperature and humidity with respect to the flow rate of the low temperature fluid in the cooling dehumidifier are incorporated, an amount of temperature change caused by the operation of the cooling dehumidifier is predicted.

In addition to the first embodiment, in accordance with a model expressing the responses of the air temperature and humidity of the entrance of the heater, the temperature of the high temperature fluid, and the air temperature and humidity on the discharge side with respect to the flow rate of the high temperature fluid in the heater, a flow rate of the high temperature fluid in the heater to realize the setting temperature is determined.

The second embodiment for accomplishing the object of the present invention comprises: a temperature control section (a cooling dehumidification control section for cooling use) for controlling the temperature when a flow rate of the low temperature fluid of the cooling dehumidifier composed of a heat exchanger is determined; a humidifier control section for controlling the humidity when a flow rate of the steam of the humidifier of steam spray is determined; and a predicting means for predicting an amount of humidity change caused by the operation of the cooling dehumidifier, wherein the amount of predicted humidity change is canceled when the flow rate of the steam of the humidifier is determined in the humidifier control section, and the flow rate of the steam of the humidifier is determined so that the setting humidity can be realized.

In addition to the second embodiment described above, using a model into which the entrance side air temperature and humidity of the cooling dehumidifier, the temperature of the low temperature fluid, and the discharge side air temperature and humidity with respect to the flow rate of the low temperature fluid in the cooling dehumidifier are incorporated, a flow rate of the low temperature fluid of the cooling dehumidifier to realize the setting temperature is determined.

In addition to the second embodiment, in accordance with a model expressing the responses of the air temperature and humidity of the entrance to the cooling dehumidifier and the responses of the air temperature and humidity on the discharge side with respect to the flow rate of the low temperature fluid in the cooling and dehumidifier, an amount of change in the humidity caused by the operation of the cooling dehumidifier is predicted.

In addition to the second embodiment, in accordance with a model expressing the responses of the temperature and humidity of air on the entrance side of the humidifier, the temperature of steam, and the temperature and humidity of air on the discharge side with respect to the flow rate of the steam in the humidifier, a flow rate of the steam in the humidifier to realize the setting humidity is determined.

The third embodiment for accomplishing the object of the present invention is composed as follows. The third embodiment comprises an apparatus selecting section in which: in order to dehumidify and heat, the cooling dehumidifier composed of the heat exchanger, and the heater composed of the heat exchanger are selected; in order to cool and humidify, the cooling dehumidifier and the humidifier composed of steam spray is selected; and in order to heat and humidify, the heater and the humidifier are selected. When it is judged by the apparatus selecting section from the temperature and humidity at the entrance of an air conditioner, as well as a setting temperature and a setting humidity that it is necessary to dehumidify and heat, the cooling dehumidifier and heater are selected. When it is judged that it is necessary to cool and humidify, the cooling dehumidifier and humidifier are selected. When it is judged that it is necessary to heat and humidify, the heater and humidifier are selected. A command to start the operation is given to each control section corresponding to the selected apparatus.

In addition to the third embodiment, in accordance with a model expressing the response of the air temperature and humidity of the entrance side of the heater, the temperature of the high temperature fluid, and the air temperature and humidity on the discharge side with respect to the flow rate of the high temperature fluid in the heater, a flow rate of the high temperature fluid in the heater to realize the setting temperature is determined.

In addition to the third embodiment, in accordance with a model expressing the responses of the temperature and humidity of air on the entrance side of the humidifier, the temperature of steam, and the temperature and humidity of air on the discharge side with respect to the flow rate of the steam in the humidifier, a flow rate of the steam of the humidifier to realize the setting humidity is determined.

With reference to FIG. 5, a temperature and humidity predicting apparatus will be described below, in which the cooling dehumidifier composing the temperature and humidity control apparatus of the present invention is used.

In general, the cooling dehumidifier composed of the heat exchanger used in an air conditioning system belongs to a distributed parameter system in which the temperature and humidity are distributed in a space. Therefore, when the cooling dehumidifier is formed into a model as it is, the model becomes complicated, so that the model is difficult to be used for the design and analysis of the cooling dehumidifier and the control system.

In this case, the cooling dehumidifier is approximated to a lumped parameter system, which will be described as follows. In the lumped parameter system, the cooling dehumidifier is divided into portions, the number of which finite, in the direction of the flow of fluid, wherein the portions include an air portion, a low temperature fluid portion, and a heat transfer tube portion provided between air and low temperature fluid. In each cell that has been divided in the above manner, it is assumed that the temperature and humidity in each cell of the air portion are uniform, and the temperature in each cell of other portions is uniform.

On a surface of the coil of the cooling dehumidifier, moisture in the air is condensed, so that the surface is in a wet condition. As a result, the coefficient of heat transfer on the wet surface is higher than that on the dry surface. In order to correct this increment, a wet surface coefficient $W_{sf}$ is used. This wet surface coefficient $W_{sf}$ is determined by a ratio $S_{hf}$ that are the sensible heat to a sum of the sensible heat and the latent heat.

i.e., $S_{hf}$=the sensible heat/the sensible heat+the latent heat

The sensible heat and the latent heat that are determined by the temperature and humidity at the inlet and outlet of the cooling dehumidifier. For example, it is known that the wet surface coefficient $W_{sf}$ is found by the following expression.

$$W_{sf}=1.04S_{hf}^2-2.63S_{hf}+2.59$$

On the other hand, even in the same cooling dehumidifier, $S_{hf}$ changes in accordance with a change in the flow rate of the low temperature fluid. When the capacity of the cooling dehumidifier is different, a relation between $S_{hf}$ and the flow rate of the low temperature fluid is different for each cooling dehumidifier. For this reason, it is difficult to find $S_{hf}$ from the flow rate. However, in any cooling dehumidifier, as long as air is subjected to cooling dehumidification in which the low temperature fluid is used, it is sure that air is subjected to cooling dehumidification in the direction of the temperature a little higher than the inlet temperature of the low temperature fluid and the saturated humidity at the same temperature with respect to the entrance temperature and humidity of air. Therefore, assuming that the outlet temperature of air is a little higher than the inlet temperature of the low temperature fluid and that the outlet humidity of air is saturated at the same temperature, an approximate value of $S_{hf}$ is calculated from the assumed outlet temperature and humidity and the actual inlet temperature and humidity, and an approximate value of the wet surface coefficient is calculated. Also, it is assumed that the heat taken away from the air side to the low temperature fluid side is used for a change in temperature and a change in the state at the ratio of $S_{hf}$.

Due to the above approximation, a fundamental expression to determine the dynamic characteristics of the humidity of air and the temperatures of air, the low temperature fluid and heat transfer tube can be obtained from the following expressions of heat balance and material balance.

From the heat balance of air, the following expression is provided.

$$\frac{C_h V_a}{v_h n} \frac{dT_a(k)}{dt} = \frac{C_h F_a}{v_h}(T_a(k-1) - T_a(k)) - \frac{W_{sf}S_{hf}h_{wl}AN}{n}(T_a(k) - T_c(k)) \quad (201)$$

$$(k = 1, 2, \cdots, n)$$

In this case, the outlet and inlet temperatures of air satisfy the following expression.

$$T_{a,out}=T_a(n),\ T_{a,in}=T_a(0)$$

Humid heat $c_h$ and humid volume $v_h$ are changed by the temperature and humidity. Accordingly, they are originally different in the expression (201). However, in a range in which the cooling dehumidifier is actually used, these values are not changed greatly. Therefore, values at the temperature and humidity of the air at the outlet are used.

That is, $$c_h = c_a + c_w H_{out} \quad (202)$$

$$v_h=(0.772+1.24H_{out})(273+T_{a,out})/273 \quad (203)$$

Next, the following expression is established from the material balance of water.

$$\frac{V_a}{v_h n}\frac{dH(k)}{dt} = \frac{F_a}{v_h}(H(k-1) - H(k)) - \frac{W_{sf}(1-S_{hf})h_{wl}AN}{n(L_0 - c_w T_a(k))}(T_a(k) - T_c(k)) \quad (204)$$

In this case, the temperature and humidity of the air at the outlet and the humidity at the inlet are expressed as follows.

$$H_{out}=H(n),\ H_{in}=H(0)$$

On the other hand, from the heat balance at the heat transfer tube portion between the air and the low temperature fluid, the following expression is satisfied.

$$\frac{\rho_c C_{p,c} V_c}{n}\frac{dT_c(k)}{dt} = -\frac{W_{sf}h_{w2}AN}{n}(T_c(k) - T_l(k)) + \frac{W_{sf}h_{wl}AN}{n}(T_a(k) - T_c(k)) \quad (205)$$

From the heat balance of the low temperature fluid, the following expression is satisfied.

$$\frac{\rho_l C_{p,l} V_l}{n}\frac{dT_l(k)}{dt} = \rho_l C_{p,l} F_l(T_l(k+1) - T_l(k)) + \frac{W_{sf}h_{w2}AN}{n}(T_c(k) - T_l(k)) \quad (206)$$

In this case, the temperature of the low temperature fluid at the outlet and the temperature at the inlet are expressed as follows.

$$T_{l,out} = T_l(1),\ T_{l,in} = T_l(n+1)$$

From the above expressions (201), (204), (205) and (206), the following expression can be obtained.

Expression of the air temperature $$\frac{dT_a(k)}{dt} = \left(-\frac{nF_a}{V_a} - \frac{W_{sf}S_{hf}v_h h_{wl}AN}{c_h V_a}\right)T_a(k) + \frac{nF_a}{V_a}T_a(k-1) + \frac{W_{sf}S_{hf}v_h h_{wl}AN}{c_h V_a}T_c(k) \quad (207)$$

$$(k = 1, 2, \cdots, n)$$

Expression of the absolute humidity of air $$\frac{dH(k)}{dt} = -\frac{nF_a}{v_a}H(k) + \frac{nF_a}{v_a}H(k-1) - \frac{W_{sf}(1-S_{hf})v_h h_{wl}AN}{V_a(L_0 - c_w T_a(k))}T_a(k) + \frac{W_{sf}(1-S_{hf})v_h h_{wl}AN}{V_a(L_0 - c_w T_a(k))}T_c(k) \quad (208)$$

$$(k = 1, 2, \cdots, n)$$

Expression of the temperature in the heat transfer tube portion between the air and the low temperature fluid $$\frac{dT_c(k)}{dt} = \quad (209)$$

-continued $$-\frac{W_{sf}(h_{w1}+h_{w2})AN}{\rho_c c_{p,c} V_c}T_c(k)+\frac{W_{sf}h_{w2}AN}{\rho_c c_{p,c} V_c}T_l(k)+\frac{W_{sf}h_{w1}AN}{\rho_c c_{p,c} V_c}T_a(k)$$

$$(k=1,2,\cdots,n)$$

Expression of the temperature of the low temperature fluid $$\frac{dT_l(k)}{dt}= \quad (210)$$

$$\left(-\frac{nF_l}{V_l}-\frac{W_{sf}h_{w2}AN}{\rho_l c_{p,l} V_l}\right)T_l(k)+\frac{nF_l}{V_l}T_l(k+1)+\frac{W_{sf}h_{w2}AN}{\rho_l c_{p,l} V_l}T_c(k)$$

$$(k=1,2,\cdots,n)$$

Until now, the humidity is described as the absolute humidity H. However, when the dew point is used, the dew point is converted into the absolute humidity, using a general relation between the dew point and the absolute humidity.

$$\frac{c_h F_a}{v_h}(T_{a,in}-T_a(n))=\frac{W_{sf}S_{hf}h_{w1}AN}{n}\sum_{k=1}^{n}(T_a(k)-T_c(k)) \quad (211)$$

In the same manner, concerning the expressions (204), (205) and (206), the steady condition is considered, and these expressions are added.

$$-\frac{W_{sf}S_{hf}h_{w2}AN}{n}\sum_{k=1}^{n}(T_c(k)-T_l(k))= \quad (213)$$

$$-\frac{W_{sf}S_{hf}h_{w1}AN}{n}\sum_{k=1}^{n}(T_a(k)-T_c(k))$$

$$\rho_l c_{p,l}F_l(T_{l,in}-T_l(1))=-\frac{W_{sf}S_{hf}h_{w2}AN}{n}\sum_{k=1}^{n}(T_c(k)-T_l(k)) \quad (214)$$

It is difficult to respectively identify the coefficient of heat transfer on the air side of the heat transfer tube and that on the low temperature fluid side. Therefore, on the assumption that $$h_{w1}=h_{w2}=h \quad (215)$$

only cooling is conducted and no dehumidification is conducted.

When consideration is given to the state of $S_{hf}=W_{sf}=1$, from the expressions (211) to (214), the following expressions can be obtained which express the entirely exchanged heat amount in the steady state.

$$Q=\frac{c_h F_a}{v_h}(T_{a,in}-T_{a(n)}) \quad (216)$$

$$Q=-\rho_l c_{p,l}F_l(T_{l,in}-T_l(1)) \quad (217)$$

$$Q=-\frac{UAN}{n}\sum_{k=1}^{n}(T_l(k)-T_a(k)) \quad (218)$$

In this case, U is an overall coefficient of heat transfer. U can be expressed by the following expression according to the relation shown by the expression (215).

$$U=h/2 \quad (219)$$

From a relation expressing the total exchanged heat amount by the logarithmic mean temperature difference commonly used in the design of heat exchangers, the following expression is satisfied.

$$Q=UAN(T_{a,in}-T_{l(1)})-\frac{(T_{a(n)}-T_{l,in})}{\ln T_{a,in}-\frac{T_{l(1)}}{T_{a(n)}-T_{l,in}}} \quad (220)$$

When the expressions (218) and (220) are compared, in the case where the number of divided portions of the cooling dehumidifier model is infinite, it is proved that the overall exchanged heat coincides with the overall exchanged heat amount by the logarithmic means temperature difference generally used for the design of the heat exchanger.

Steady values of temperature of air and low temperature fluid at the inlet and outlet with respect to the hot water flow rate are substituted into the expressions (216), (217) and (220), the overall coefficient of heat transfer U is found, and the coefficients of heat transfer $h_{w1}$, $h_{w2}$ in the cooling dehumidifying model are determined from the relation of the expressions (215) and (219).

As described above, when the coefficient of heat transfer is found, it is not necessary to individually find the film coefficient of heat transfer on the air side, the coefficient of heat transfer at the heat transfer tube portion between the air and the low temperature fluid, and the film coefficient of heat transfer on the cooling side. In order to find the overall coefficient of heat transfer of the air and the low temperature fluid, it is sufficient that the temperatures at the air inlet, air outlet and cooling water inlet are measured under the condition that the heat transfer tube portion between the air and the low temperature fluid is dry. It is not necessary to install a temperature sensor for investigating the temperature distribution in the cooling dehumidifier.

When the overall coefficient of heat transfers in various flow rate regions are found by this method, they can be used when the flow rate is variously changed.

It is not necessary to adjust the parameters with respect to a change in the wet condition of the surface caused when the temperature and humidity of the cooling dehumidifier at the inlet is greatly changed. Accordingly, they can be used in various temperature and humidity conditions.

When $S_{hf}=W_{sf}=1$, the cooling and dehumidifying model described above can be used as a heater model in the case where the heat exchanger is used as a heater.

An example of the cooling and dehumidifying model is explained above which is adopted for the cooling dehumidifying control section used for the temperature and humidity control apparatus of the present invention. As long as the entrance side air temperature and humidity, the low temperature fluid temperature, and the relation between the cooling dehumidifier operation amount and the discharge side air temperature and humidity can be expressed, any models may be used, for example, a regression model may be used.

FIG. 4 is a humid air diagram showing the selecting operation of the apparatus selecting section composing the temperature and humidity control apparatus of the present invention.

In the drawing, the vertical axis represents an absolute humidity (kg/kg-dry air), and the horizontal axis represents the temperature (° C.). The entrance humidity $H_{in}$ is shown on the vertical axis, and the entrance side temperature $T_{ain}$ and the low temperature fluid temperature $T_l$ are shown on the horizontal axis. Curve A shows a locus of saturated steam at a predetermined temperature. Point m is determined by the entrance humidity $H_{in}$ and the entrance side temperature $T_{a,in}$. Three regions I, II and III are defined by the normal line the vertical line which pass through the point m, and also defined by the straight line or curve connecting the point m with the point p which corresponds to the low temperature fluid temperature $T_l$ on the curve A expressing the locus of saturated steam.

According to the setting values of temperature and humidity on the discharge side, it is selected whether it belongs to the region I, II or III. When it belongs to the region I, it is judged that dehumidification and heating are required. When it belongs to the region II, it is judged that humidification and cooling are required. When it belongs to the region III, it is judged that humidification and heating are required.

Consequently, the apparatus selecting section makes selection as follows. When it is judged according to the air conditioner entrance temperature and humidity and the setting temperature and humidity that it belongs to the region I, the cooling dehumidifier and the heater are selected. When it is judged that it belongs to the region II, the cooling dehumidifier and the humidifier are selected. When it is judged that it belongs to the region III, the heater and the humidifier are selected. When an operation start command is given to each control section corresponding to the selected apparatus, the apparatus selecting section selects an apparatus necessary for setting the entrance air temperature and humidity at the minimum energy after the passage of an air conditioner. Accordingly, control is conducted only by the selected drawing. Therefore, energy can be saved, which is economical from the viewpoint of energy saving.

When the cooling dehumidifier and the heater are selected by the apparatus selecting section, the cooling dehumidifier control section for dehumidification use determines a low temperature fluid amount for realizing the setting humidity, and at the same time, the cooling dehumidifier control section also predicts a cooling amount cooled by the cooling dehumidifier. The heater control section cancels this cooling predicted value and determines a high temperature fluid amount to realize the setting temperature. Due to the foregoing, an apparatus for obtaining the setting values of both temperature and humidity is selected. Therefore, either the temperature control or the humidity control is not neglected, so that the control accuracy can be enhanced.

In the case where the apparatus selecting section selects the cooling dehumidifier and the humidifier, the cooling dehumidifier control section for cooling use determines a low temperature fluid amount to realize the setting temperature is determined, and at the same time, a dehumidifying amount dehumidified by the cooling dehumidifier is predicted. The humidifier control section cancels this dehumidifying predicted amount and determines a steam amount to realize the setting humidity.

In the case where the cooling dehumidifier and the heater are selected by the apparatus selecting section, the cooling dehumidification control section for dehumidification use detects the entrance side air temperature and humidity. In accordance with a model (e.g., a temperature and humidity predicting appratus) in which the responses of the entrance side air temperature and humidity of the cooling dehumidifier, the low temperature fluid temperature, and the discharge side air temperature and humidity with respect to the low temperature fluid amount, are expressed, the low temperature fluid amount to realize the setting humidity is determined, and at the same time, the heater control section cancels a cooling amount cooled by the cooling dehumidifier. The high temperature fluid amount to realize the setting temperature is determined in accordance with a model in which the responses of the entrance side air temperature and humidity of the heater, the high temperature fluid temperature, and the discharge side air temperature with respect to the high temperature fluid amount, are expressed. Accordingly, without conducting an adjustment in the manner of trial and error, a feed forward control is conducted in accordance with the entrance temperature and humidity, and at the same time, an amount of cooling of the cooling dehumidifier is canceled, so that a highly accurate temperature and humidity control can be realized.

Both the cooling dehumidifier control section and the heater control section detect the high temperature fluid temperature and the low temperature fluid temperature, and determine the fluid amount. Accordingly, even if these factors fluctuate, the accuracy can be maintained high.

In the case where the cooling dehumidifier and the humidifier are selected by the apparatus selecting section, the cooling dehumidification control section for cooling use detects the entrance side air temperature and humidity, and the low temperature fluid flow rate to realize the setting temperature is determined, and at the same time, and an amount of dehumidification conducted by the cooling dehumidifier is previously suggested to the humidifier control section. The humidifier control section determines an amount of steam to cancel the amount of dehumidification and to reach the setting humidity, in accordance with a model in which the responses of the entrance side air temperature and humidity to the humidifier and the discharge side air humidity with respect to the steam amount, are expressed. Accordingly, without making an adjustment in the manner of trial and error, feed forward control is conducted in accordance with the entrance temperature, and at the same time a highly accurate temperature and humidity control is realized while the amount of dehumidification in the cooling dehumidifier is canceled.

The cooling dehumidifier control section determines an amount of fluid when it also detects the temperature of the low temperature fluid. Therefore, irrespective of fluctuation, it is possible to maintain a high accuracy.

DESCRIPTION OF THE MOST PREFERRED EMBODIMENT

Figure 1:
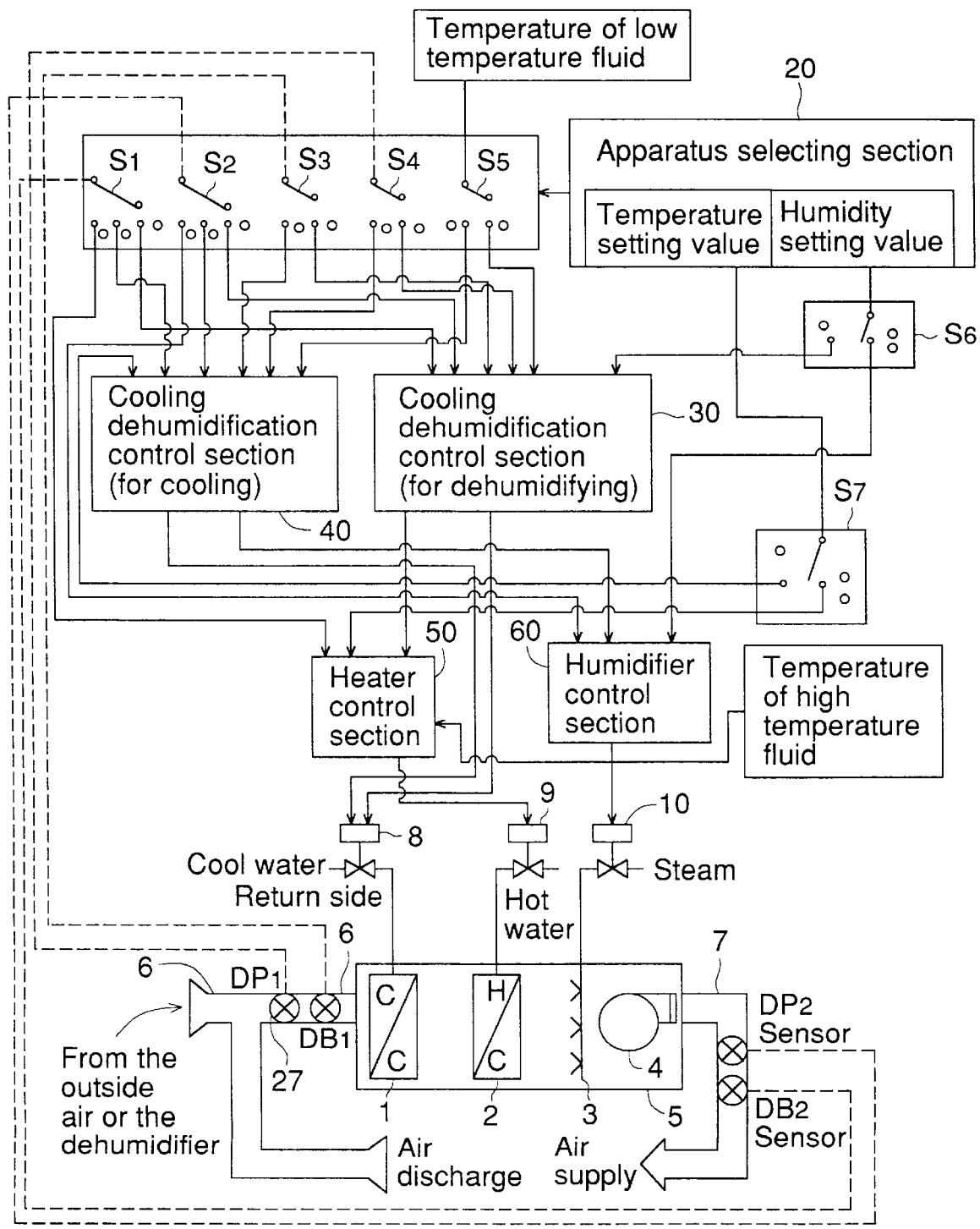
FIG. 1 is a functional block diagram showing an example of the temperature and humidity control apparatus of the present invention.
Figure 2:
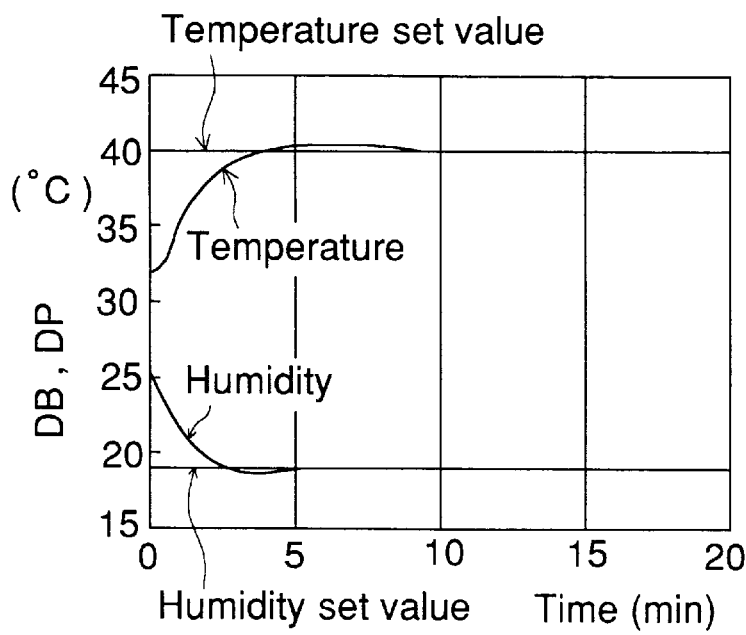
FIG. 2 is a graph showing a state of control of the temperature and humidity of the temperature and humidity control apparatus of this example.
Figure 3:
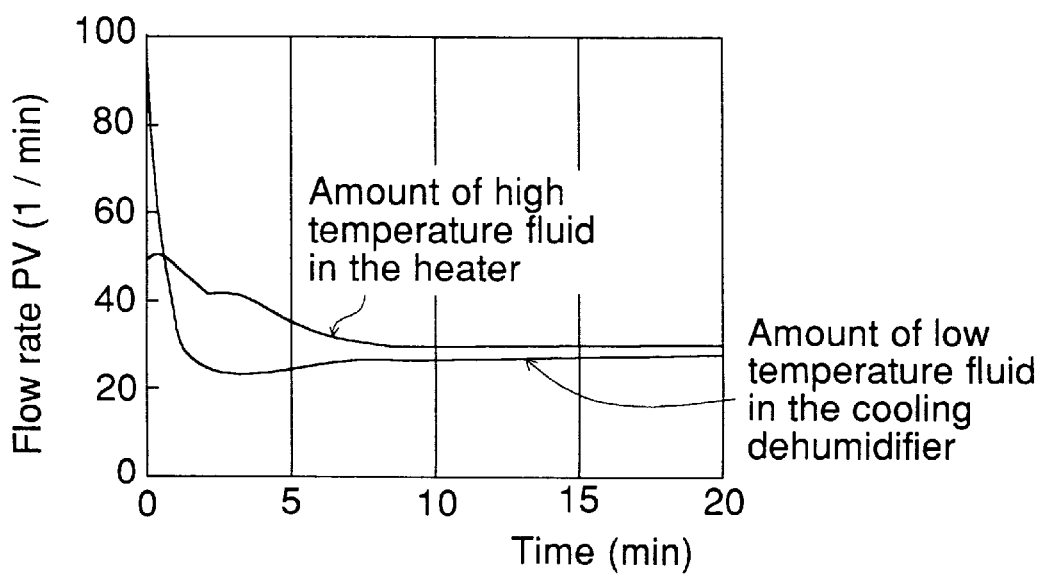
FIG. 3 is a graph showing changes in the amount of high temperature fluid in the heater and a change in the amount of low temperature fluid in the cooling dehumidifier.

With reference to FIGS. 1 to 3, a preferred embodiment of the present invention will be described in detail as follows.

FIG. 1 is a functional block diagram showing an embodiment of the temperature and humidity control apparatus of the present invention.

As illustrated in FIG. 1, the temperature and humidity control apparatus of this embodiment comprises: an air-conditioner body including a cooler coil 1 corresponding to the cooling dehumidifier, a heater coil 2 corresponding to the heater 2, a steam spray 3 corresponding to the humidifier, and a blower 4; an outside air introducing passage 6 connected to the air-conditioner body 5; a humidity passage 7; a cooling dehumidification control valve 8 connected to the cooling dehumidifier 1; a heating control valve 9 connected to the heater 2; a humidification control valve 10 connected to the humidifier 3; an outside air temperature sensor $DB_1$ arranged in the outside air introducing passage 6; an outside air humidity sensor $DP_1$ arranged in the outside air introducing passage 6; a ventilation side temperature sensor $DB_2$ arranged in the ventilation passage 7; a ventilation side humidity sensor $DP_2$ arranged in the ventilation passage 7; an apparatus selecting section 20; a cooling dehumidification control section 30 for dehumidification use; a cooling dehumidification control section 40 for cooling use; a heater control section 50; and a humidifier control section 60.

Low temperature fluid such as cool water, the flow rate of which is controlled, is supplied to the cooling dehumidifier 1 through the cooling dehumidification control valve 8. High temperature fluid such as hot water or steam, the flow rate of which is controlled, is supplied to the heater 2 through the heating control valve 9. Steam, the flow rate of which is controlled, is supplied to the humidifier 3 through the humidification control valve 10.

The ventilation side temperature sensor $DB_2$ is connected to the input terminal of the switch $S_1$. The ventilation side humidity sensor $DP_2$ is connected to the input terminal of the switch $S_2$. The outside air side temperature sensor $DB_1$ is connected to the input terminal of the switch $S_3$. The outside air side humidity sensor $DP_1$ is connected with the input terminal of the switch $S_4$. The output terminals of the switches $S_1$ to $S_7$ are connected to the cooling dehumidification control section 30 for dehumidification use, the cooling dehumidification control section 40 for cooling use, the heater control section 50, and the humidifier control section 60. According to the selecting operation of the apparatus selecting section 20, the switches are operated so that the terminals can be selectively connected.

Figure 4:
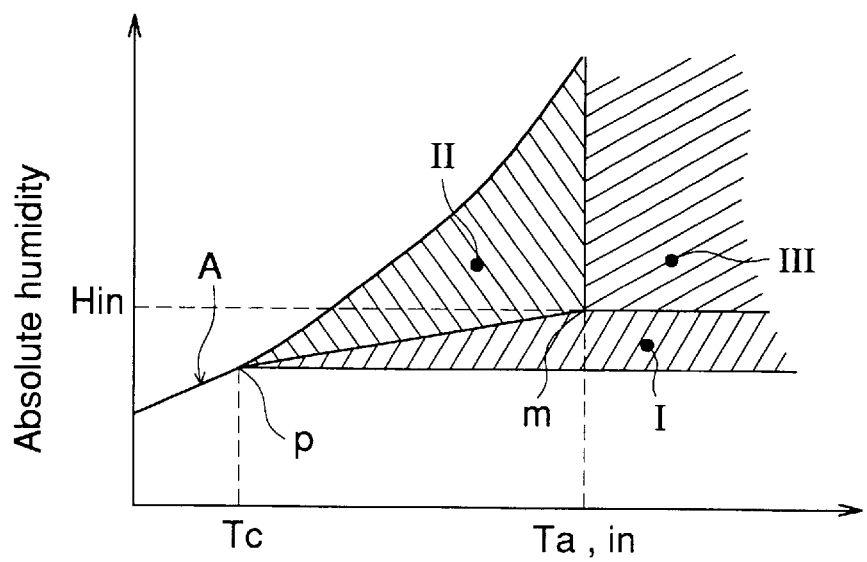
FIG. 4 is a humid air diagram showing the selecting motion of the apparatus selecting section composing the temperature and humidity control apparatus of the present invention.
Figure 5:
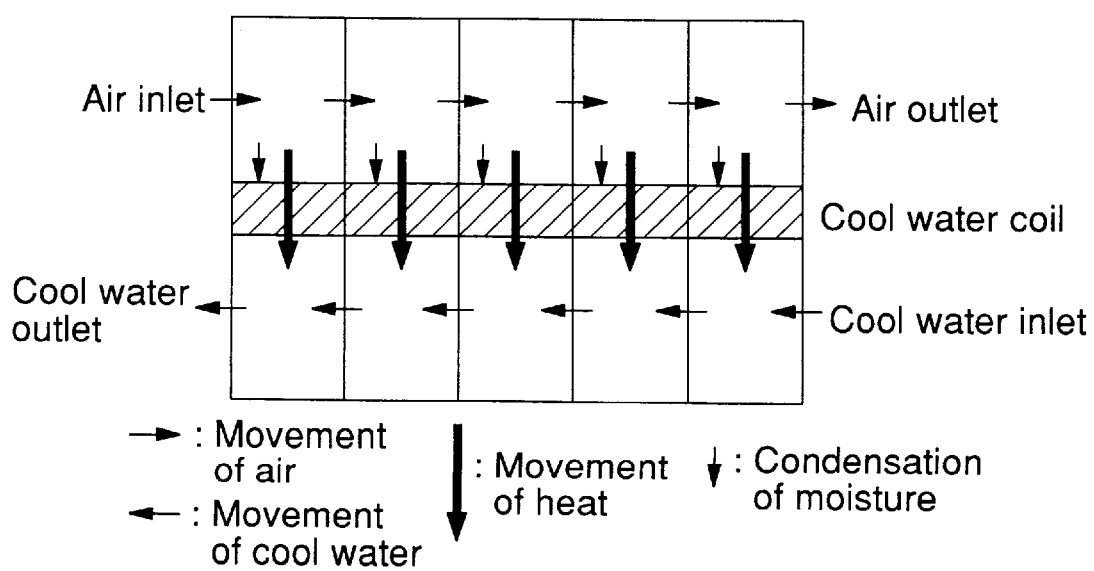
FIG. 5 is a model of heat exchange of the cooling dehumidifier control section composing the temperature and humidity control apparatus of the present invention.
Figure 6:
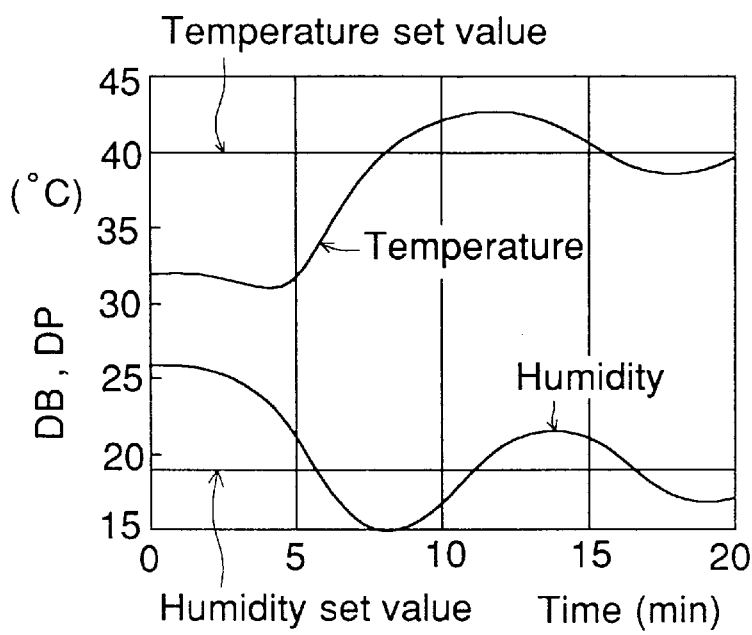
FIG. 6 is a graph showing a state of control of the temperature and humidity in the temperature and humidity control apparatus of the prior art.
Figure 7:
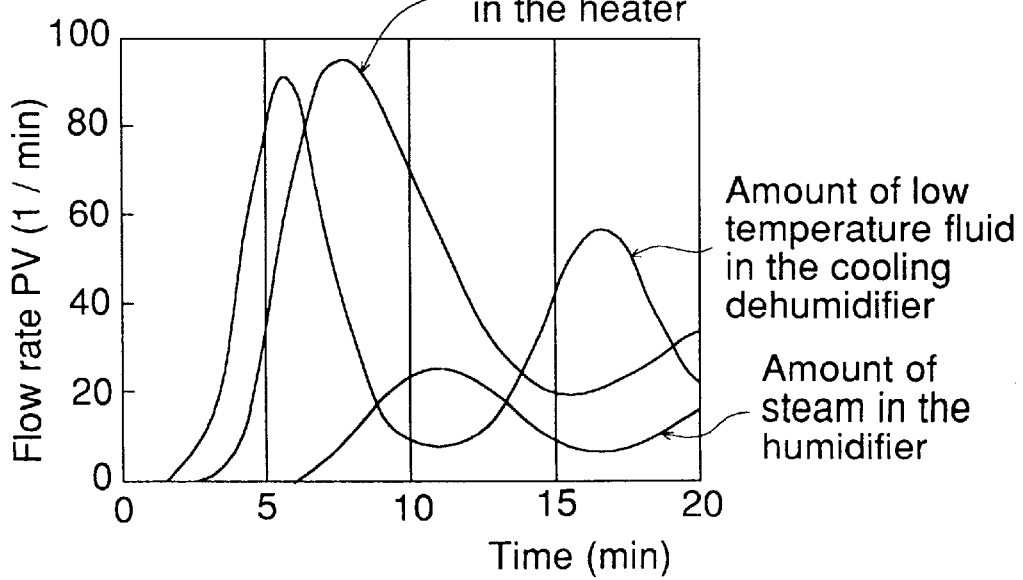
FIG. 7 is a graph showing the changes in an amount of high temperature fluid in the heater, an amount of low temperature fluid in the cooling dehumidifier and an amount of steam in the humidifier.

The apparatus selecting section 20 determines the three regions I, II and III shown in FIG. 4 in accordance with the air-conditioner inlet temperature, the air-conditioner inlet humidity, the setting temperature and the setting humidity. From the setting temperature and the setting humidity, it is judged which region it belongs to. When it is judged that it belongs to the region I, the apparatus selecting section 20 selectively controls the switches $S_1$ to $S_6$ and sends the data to the cooling dehumidification control section 30 and the heater control section 50. Due to the foregoing, the cooling dehumidifier 1 and the heater 2 are selected. When it is judged that it belongs to the region II, the apparatus selecting section 20 selectively controls the switches $S_1$ to $S_6$ and sends the data to the cooling dehumidification control section 40 and the humidifier control section 60. Due to the foregoing, the cooling dehumidifier 1 and the humidifier 3 are selected. When it is judged that it belongs to the region III, the apparatus selecting section 20 selectively controls the switches $S_1$ to $S_6$ and sends the data to the heater control section 50 and the humidifier control section 60. Due to the foregoing, the heater 2 and the humidifier 3 are selected. One of the control sections 30, 40, 50, 60 is given a command of start of operation in accordance with the selected apparatus.

The cooling dehumidification control section 30 determines an amount of low temperature fluid to realize the setting humidity, and at the same time the cooling dehumidification control section 30 predicts an amount of cooling conducted by the cooling dehumidifier 1. The heater control section 50 cancels this amount of prediction of cooling and determines an amount of high temperature fluid to realize the setting temperature.

The cooling dehumidification control section 40 determines an amount of low temperature fluid to realize the setting temperature, and at the same time the cooling dehumidification control section 40 predicts an amount of dehumidification conducted by the cooling dehumidifier 1. The humidifier control section 60 cancels this amount of prediction of dehumidification and determines an amount of steam to realize the setting humidity.

In accordance with a model (for example, a temperature and humidity predicting apparatus) in which the responses of the entrance side air temperature and humidity of the cooling dehumidifier 1, the temperature of the low temperature fluid, and the discharge side air temperature and humidity with respect to the amount of the low temperature fluid, are expressed, the cooling dehumidification control section 30 and the cooling dehumidification control section 40 determines an amount of the low temperature fluid to realize the setting humidity and predicts an amount of cooling, or alternatively determines an amount of the low temperature fluid to realize the setting temperature and predicts an amount of dehumidification.

In accordance with a model in which the responses of the entrance side air temperature and humidity of the heater 2, the temperature of the high temperature fluid, and the discharge side air temperature with respect to an amount of the high temperature fluid, are expressed, the heater control section 50 determines an amount of the high temperature fluid to realize the setting temperature.

In accordance with a model in which the response of the discharge side air humidity of the humidifier 3 to the entrance side air temperature and humidity and the amount of steam is expressed, the humidifier control section 60 determines an amount of steam to realize the setting humidity.

Concerning the control method of the cooling dehumidifier, it is possible to use the prediction control by which the near future can be predicted and also to use the optimal control by which the evaluation function can be made to be optimum. When the cooling dehumidifier model is used, it is possible to use the same model when it is made to be linear.

By way of example, the optimum control will be explained as follows, in which a model obtained when the cooling dehumidifier model is made to be linear is used.

In this case, how to obtain the linear model of the cooling dehumidifier is explained as follows.

The cooling dehumidifier model expressed by the above expressions (207), (208), (209), (210) contains a non-linear term. Accordingly, it is impossible to use the model for the design of the control system as it is. Therefore, a cooling dehumidifier linearizing model is found.

When the expressions (207), (208), (209), (210), which are the humidifier models, are linearized with respect to the variation term of each variable at a position close to the steady operation point, the expression (301) can be provided. In this expression, Δ represents a variation term.

$$\dot{x} = Ax + Bu + Dw \tag{301}$$

$$x^T = [\Delta T_a(n) \quad \Delta T_a(n-1) \quad \cdots \quad \Delta T_a(2) \quad \Delta T_a(1)$$
$$\Delta H(n) \quad \Delta H(n-1) \quad \cdots \quad \Delta H(2) \quad \Delta H(1)$$
$$\Delta T_c(n) \quad \Delta T_c(n-1) \quad \cdots \quad \Delta T_c(2) \quad \Delta T_c(1)$$
$$\Delta T_l(n) \quad \Delta T_l(n-1) \quad \cdots \quad \Delta T_l(2) \quad \Delta T_l(1)]$$

$$u = \Delta F_l$$

$$\overline{w}^T = [\Delta T_{a,in} \quad \Delta H_{in} \quad \Delta T_{l,in}]$$

feedback control system of this embodiment is composed of a state observer and an integration type control system.

The state observer is found from the linear model of the cooling dehumidifier described above.

In this case, the disturbance $w^T = [\Delta T_{a,in}, \Delta T_{1,in}]$ represents the air temperature fluctuation and the low temperature fluid temperature fluctuation at the entrance of the cooling dehumidifier. On the assumption that the influence is small, the cooling dehumidifier linear model is expressed by the following expression.

$$\dot{x} = Ax + Bu \tag{302}$$

The output equation is expressed as follows.

$$y = Cx \tag{303}$$

$$A = \begin{bmatrix}
a1 & a2 & 0 & \cdots & 0 & 0 & 0 & \cdots & 0 & 0 & a3 & 0 & \cdots & \cdots & 0 & 0 & 0 & \cdots & 0 & 0 \\
0 & a1 & a2 & \ddots & \vdots & 0 & 0 & \cdots & 0 & 0 & 0 & a3 & \ddots & & \vdots & 0 & 0 & \cdots & 0 & 0 \\
\vdots & & \ddots & \ddots & \ddots & 0 & \vdots & \vdots & \ddots & \vdots & \vdots & & \ddots & \ddots & & \vdots & \vdots & \ddots & \vdots & \vdots \\
\vdots & & & \ddots & a1 & a2 & 0 & 0 & \cdots & 0 & 0 & \vdots & & & \ddots & a3 & 0 & 0 & 0 & \cdots & 0 & 0 \\
0 & \cdots & \cdots & 0 & a1 & 0 & 0 & \cdots & 0 & 0 & 0 & \cdots & \cdots & 0 & a3 & 0 & 0 & \cdots & 0 & 0 \\
a_4(n) & 0 & \cdots & \cdots & 0 & a5 & a6 & 0 & \ldots & 0 & a_7(n) & 0 & \cdots & \cdots & 0 & 0 & 0 & \cdots & 0 & 0 \\
0 & a_4(n-1) & \ddots & & \vdots & 0 & a5 & a6 & \ddots & \vdots & 0 & a_7(n-1) & \ddots & & \vdots & 0 & 0 & \cdots & 0 & 0 \\
\vdots & & \ddots & \ddots & \vdots & \vdots & \ddots & \ddots & \ddots & 0 & \vdots & & \ddots & \ddots & & \vdots & \vdots & \ddots & \vdots & \vdots \\
\vdots & & \ddots & a_4(2) & 0 & \vdots & & \ddots & a5 & a6 & \vdots & & \ddots & a_7(2) & 0 & 0 & 0 & \cdots & 0 & 0 \\
0 & \cdots & \cdots & 0 & a_4(1) & 0 & \cdots & \cdots & 0 & a5 & 0 & \cdots & \cdots & 0 & a_7(1) & 0 & 0 & \cdots & 0 & 0 \\
a8 & 0 & \cdots & \cdots & 0 & 0 & 0 & \cdots & 0 & 0 & a9 & 0 & \cdots & \cdots & 0 & a10 & 0 & \cdots & \cdots & 0 \\
0 & a8 & \ddots & & \vdots & 0 & 0 & \cdots & 0 & 0 & 0 & a9 & \ddots & & \vdots & 0 & a10 & \ddots & & \vdots \\
\vdots & & \ddots & & \vdots & \vdots & \vdots & \ddots & \vdots & \vdots & \vdots & & \ddots & & \vdots & \vdots & \ddots & \vdots & \vdots \\
\vdots & & \ddots & a8 & 0 & 0 & 0 & \cdots & 0 & 0 & \vdots & & \ddots & a9 & 0 & \vdots & & \ddots & a10 & 0 \\
0 & \cdots & \cdots & 0 & a8 & 0 & 0 & \cdots & 0 & 0 & 0 & \cdots & \cdots & 0 & a9 & 0 & \cdots & \cdots & 0 & a10 \\
0 & 0 & \cdots & 0 & 0 & 0 & 0 & \cdots & 0 & 0 & a11 & 0 & \cdots & \cdots & 0 & a10 & 0 & \cdots & \cdots & 0 \\
0 & 0 & \cdots & 0 & 0 & 0 & 0 & \cdots & 0 & 0 & 0 & a11 & \ddots & & \vdots & a12 & a13 & \ddots & & \vdots \\
\vdots & \vdots & \ddots & \vdots & \vdots & \vdots & \vdots & \ddots & \vdots & \vdots & & & \ddots & \ddots & & 0 & & \ddots & \ddots & \vdots \\
0 & 0 & \cdots & 0 & 0 & 0 & 0 & \cdots & 0 & 0 & & & \ddots & a11 & 0 & \vdots & \ddots & a12 & a13 & 0 \\
0 & 0 & \cdots & 0 & 0 & 0 & 0 & \cdots & 0 & 0 & \cdots & \cdots & 0 & a11 & 0 & \cdots & 0 & a12 & a13
\end{bmatrix}$$

$$B^T = [0 \quad 0 \quad \cdots \quad 0 \quad 0 \quad 0 \quad 0 \quad \cdots \quad 0 \quad 0 \quad 0 \quad 0 \quad \cdots \quad 0 \quad 0 \quad b_1(n) \quad b_1(n-1) \quad \cdots \quad b_1(2) \quad b_1(1)]$$

$$D^T = \begin{bmatrix}
0 & 0 & \cdots & 0 & d_1 & 0 & 0 & \cdots & 0 & 0 & 0 & 0 & \cdots & 0 & 0 & 0 & 0 & \cdots & 0 & 0 \\
0 & 0 & \cdots & 0 & 0 & 0 & 0 & \cdots & 0 & d_2 & 0 & 0 & \cdots & 0 & 0 & 0 & 0 & \cdots & 0 & 0 \\
0 & 0 & \cdots & 0 & 0 & 0 & 0 & \cdots & 0 & 0 & 0 & 0 & \cdots & 0 & 0 & d_3 & 0 & \cdots & 0 & 0
\end{bmatrix}$$

$$a_1 = -\frac{nF_a}{V_a} - \frac{v_h W_{sf} h_{w1} AN S_{hf}}{c_h V_a}, \quad a_2 = \frac{nF_a}{V_a}, \quad a_3 = \frac{v_h W_{sf} h_{w1} AN S_{hf}}{c_h V_a}$$

$$a_4(k) = -\frac{v_h W_{sf} h_{w1} AN(1 - S_{hf})}{V_a(L_0 - c_w T_a(k))}, \quad a_5 = -\frac{nF_a}{V_a}, \quad a_6 = \frac{nF_a}{V_a},$$

$$a_7(k) = \frac{v_h W_{sf} h_{w1} AN(1 - S_{hf})}{V_a(L_0 - c_w T_a(k))}$$

$$a_8 = \frac{W_{sf} h_{w1} AN}{\rho_c C_{p,c} V_c}, \quad a_9 = -\frac{(h_{w1} + h_{w2})AN}{\rho_c C_{p,c} V_c}, \quad a_{10} = \frac{W_{sf} h_{w2} AN}{\rho_c C_{p,c}}$$

$$a_{11} = \frac{W_{sf} h_{w2} AN}{\rho_l C_{p,l} V_l}, \quad a_{12} = \frac{nF_{l,s}}{V_l}, \quad a_{13} = -\frac{nF_{l,s}}{V_l} - \frac{W_{sf} h_{w2} AN}{\rho_l C_{p,l} V_l}$$

$$b_1(k) = \frac{n(T_{l,s}(k+1) - T_{l,s}(k))}{V_l}, \quad d_1 = \frac{nF_a}{V_a}, \quad d_2 = \frac{nF_a}{V_a}, \quad d_3 = \frac{nF_{l,s}}{V_l}$$

The following are explanations of the feedback control system of the temperature and humidity control apparatus of this embodiment.

In the feedback control system of this embodiment, the linear model of the cooling dehumidifier is utilized. The where $y = \Delta T_a(n) = \Delta T_{a,out}$ $C = [1 \quad 0 \quad \ldots \quad 0] \in R^{1 \times 3n}$ The minimum order state observer of the system expressed by the expressions (3020, (303) is disclosed in D. G. Luenberger: Observers for Multivariable Systems, IEEE, AC-11, 190197 (1966)).

$$\hat{x} = [\hat{C}, \hat{D}] \begin{bmatrix} z \\ y \end{bmatrix} \quad (304)$$

$$\dot{z} = \hat{A}z + \hat{B}y + \hat{J}u \quad (305)$$

The minimum order state observer of the expressions (304), (305) can be designed according to the design method of Gopinath (B. Gopinath: On the Control of Linear Multiple Input-Output Systems, The Bell Technikal Journal 50(3), 1063–1081 (1971).

In this case, the following expression is set up.

$$v = d/dt\ u$$

When the output variable y reaches a predetermined target value r, the deviation δx of each state variable from the steady state may be made to be 0. Therefore, the objective function is set up as follows.

$$J = \int_0^\infty (\delta x^T R \delta x + v^T P v) dt \quad (306)$$

Therefore, the control law is set up as follows.

$$u = -K_1 x - K_2 \int^t (y-r) dt \quad (307)$$

In this case, as described above, an estimate of the minimum order state observer is used for the state variables x. Therefore, the control law is given by the following expression.

$$u = -K_1 \hat{x} - K_2 \int^t (y-r) dt \quad (308)$$

The following are explanations of the control system in which the above feedback control system and the feedforward control system using the cooling dehumidifier model are jointly used.

In the above cooling dehumidifier model, when a flow rate of the low temperature fluid is constant, the model can be assumed to be a linear differential equation. With respect to a flow rate, the steady integral of this linear differential equation is found, and a flow rate of the low temperature fluid is changed until $T_{a,out}$, that is, a solution with respect to the air temperature at the outlet of the cooling dehumidifier coincides with the setting value $T_{a,out,sv}$. The above calculation is repeated, and this flow rate of the low temperature fluid is determined to be an manipulated variable. The amount of this manipulated variable and that of the aforementioned feedback control system. In this connection, marks used in the above expressions are defined as follows.

a: Heat transfer area per one row [m²]
$a_k$: Auxiliary variable of state equation [-]
A: Matrix of coefficients of state equation [-]
$\hat{A}$: Matrix of coefficients of state observer [-]
$b_1(k)$: Auxiliary variable of state equation [-]
B: Matrix of coefficients of state equation [-]
$\hat{B}$: Vector of coefficient of state observer [-]
$c_a$: Specific heat of dry air [kcal/° C. kg-dry air]
$c_h$: Humid heat [kcal/° C. kg air]
$c_{p,c}$: Specific heat of heat transfer tube [kcal/kg.° C.]
$c_{p,l}$: Specific low or high temperature fluid [kcal/kg.° C.]
$c_w$: Specific heat of steam [kcal/kg.° C.]
C: Vector of coefficient of state equation [-]
$\hat{C}$: Matrix of coefficients of state observer [-]
$d_k$: Auxiliary variable of state equation [-]
D: Matrix of coefficients of state equation [-]
$\hat{D}$: Matrix of coefficients of state observer [-]
$F_a$: Flow rate of air [m³/s]
$F_l$: Flow rate of low or high temperature fluid [m³/s]
H: Absolute humidity [kg/kg-dry air]
h: Coefficient of heat transfer [kcal/.s.° C.]
$\hat{J}$: Matrix of coefficients of state observer [-]
j: Value of objective function [-]
$K_1$: Vector of feedback gain [-]
$K_2$: Gain of integral element [-]
$L_0$: Latent heat of evaporation of water at 0° C. [kJ/kg]
n: Number of division in model [-]
N: Number of rows of cooling dehumidifier or heater
P: Weighted matrix of objective function [-]
Q: Quantity of heat transfer [kJ]
R: Weighted matrix of objective function [-]
r: Set value [-]
$S_{hf}$: (sensible heat)/{(latent heat)+(sensible heat)}[-]
T: Temperature [° C.]
$T_a(k)$: Air temperature [° C.]
$T_c(k)$: Heat transfer tube temperature [° C.]
$T_l(k)$: Temperature of low or high temperature fluid[° C.]
u: Manipulated variable [-]
U: Overall coefficient of heat transfer [kJ/.s.° C.]
$v_h$: Humid volume [m³/kg-dry air]
V: Volume [m³]
$W_{sf}$: Humid face correction coefficient [-]
w: Disturbance variable vector [-]
x: State variable vector [-]
y: Output variable [-]
ρ: Density [kg/m³]
Δ: Term of variation [-]
in: Entry side of heat exchanger
out: Delivery side of heat exchanger
a: Air
c: Heat transfer coil
l: Low or high temperature fluid
s: Steady state
sv: Set value
w1: Film on the air side of heat transfer coil
w2: Film on the hot or cold water side of heat transfer coil FIG. 2 is a graph showing the control condition of temperature and humidity in the temperature and humidity control apparatus of this example. FIG. 3 is a graph showing changes in an amount of high temperature fluid in the heater and an amount of low temperature fluid in the cooling dehumidifier.

According to FIG. 3, the apparatus selecting section selects an apparatus necessary for setting temperature and humidity of the entrance air at the minimum energy after passing through the air-conditioner. Accordingly, control is conducted only by the selected apparatus. Therefore, energy can be saved.

According to FIG. 2, an amount of low temperature fluid for realizing the setting humidity is determined by the cooling dehumidifier control section, and at the same time, an amount of cooling conducted by the cooling dehumidifier is predicted. The heater control section cancels this predicted amount of cooling and determines an amount of high temperature fluid for realizing the setting temperature. Therefore, neither the control of temperature nor the control of humidity is neglected when the apparatus is selected for obtaining the set values of temperature and humidity. Accordingly, the deviation of control is small.

The cooling dehumidification control section detects the entrance side air temperature and humidity and determines an amount of low temperature fluid by which the setting humidity can be provided, and at the same time, an amount of cooling conducted by the cooling dehumidifier is previously suggested to the heater control section, and the heater control section cancels this cooling amount and determines an amount of high temperature fluid by which the setting temperature can be provided. Accordingly, it is possible to realize a feed forward control in accordance with the entrance temperature and humidity without conducting an adjustment in the manner of trial and error, and at the same time, it is also possible to realize a highly accurate temperature and humidity control in which an amount of cooling conducted by the cooling dehumidifier is canceled.

Both the cooling dehumidifier control section and the heater control section detect the temperatures of high and low temperature fluids and determines an amount of fluid. Therefore, even when the temperatures of high and low temperature fluids fluctuate, the accuracy can be maintained.

According to the present invention, the apparatus selecting section selects an apparatus necessary for setting temperature and humidity of the entrance air at the minimum energy after passing through the air-conditioner. Accordingly, control is conducted only by the selected apparatus. Therefore, energy can be saved.

According to the temperature and humidity prediction apparatus of the present invention, it is not necessary to individually find a heat transfer coefficient of the film on the air side, a heat transfer coefficient of the heat transfer tube portion between the air and low temperature fluid, and a heat transfer coefficient of the film on the low temperature fluid side. It can be attained when only the entrance air temperature and humidity, discharge air temperature and entrance cool water temperature are measured under the condition that the heat transfer tube portion between the air and the low temperature fluid is dry. Accordingly, it is sufficient that the overall coefficient of heat transfer is found between the air and the low temperature fluid. Further, when the overall coefficients of heat transfer in various flow rate regions are found, the present invention can be applied to a case in which the flow rate is changed.

According to the temperature and humidity prediction apparatus of the present invention, even when the wet condition of the surface is changed when the entrance temperature and humidity of the cooling dehumidifier are greatly changed, it is not necessary to adjust the parameter. Therefore, it is possible to apply the present invention to various temperature and humidity conditions.

What is claimed is:

1. A temperature and humidity control apparatus comprising:
    (a) input means for inputting a setting humidity and a setting temperature;
    (b) a cooling dehumidifier composed of a heat exchanger;
    (c) a cooling dehumidifier control section for determining a flow rate of a low temperature fluid in the cooling dehumidifier according to the setting humidity, and for controlling the cooling dehumidifier according to the flow rate of the low temperature fluid;
    (d) predicting means for predicting an amount of temperature change caused by operation of the cooling dehumidifier;
    (e) a heater; and
    (f) a heater control section for determining a flow rate of a high temperature fluid in the heater, according to the setting temperature and the amount of temperature change predicted by the predicting means, to compensate for the amount of temperature change predicted by the predicting means, and for controlling the heater according to the flow rate of the high temperature fluid.

2. The temperature and humidity control apparatus of claim 1, wherein the cooling dehumidifier control section determines the flow rate of the low temperature fluid in the cooling dehumidifier, according to a model with respect to temperature and humidity of air at an inlet of the cooling dehumidifier, temperature of the low temperature fluid in the cooling dehumidifier, temperature and humidity of air at an outlet of the cooling dehumidifier, and the flow rate of the low temperature fluid in the cooling dehumidifier.

3. The temperature and humidity control apparatus of claim 2, wherein the model expresses responses into which temperature and humidity of the air at the inlet of the cooling dehumidifier, temperature of the low temperature fluid at the inlet of the cooling dehumidifier, and temperature and humidity of the air at the outlet of the cooling dehumidifier with respect to the flow rate of the low temperature fluid in the cooling dehumidifier are incorporated.

4. The temperature and humidity control apparatus of claim 1, wherein the predicting means predicts the amount of temperature change caused by the operation of the cooling of dehumidifier, according to a model with respect to temperature and humidity of air at an inlet of cooling dehumidifier, temperature of the low temperature fluid, temperature and humidity of air at an outlet of the cooling dehumidifier, and the flow rate of the low temperature fluid in the cooling dehumidifier.

5. The temperature and humidity control apparatus of claim 4, wherein the model expresses responses into which temperature and humidity of the air at the inlet of the cooling dehumidifier, and temperature and humidity of the air at the outlet of the cooling dehumidifier with respect to the flow rate of the low temperature fluid in the cooling dehumidifier are incorporated.

6. The temperature and humidity control apparatus of claim 1, wherein the heater control section determines the flow rate of the high temperature fluid in the heater according to a model with respect to temperature and humidity of air at an inlet of the cooling dehumidifier, temperature of the high temperature fluid at an inlet of the heater, temperature and humidity of air at an outlet of the heater and a flow rate of the high temperature fluid in the heater.

7. The temperature and humidity control apparatus of claim 6, wherein the model expresses responses into which temperature and humidity of the air at the inlet of the cooling dehumidifier, temperature of the high temperature fluid at the inlet of the heater, and temperature and humidity of the air at the outlet of the heater with respect to the flow rate of the high temperature fluid in the heater are incorprated.

8. The temperature and humidity control apparatus of claim 1 wherein said cooling dehumidifier has a plurality of cells formed by dividing the cooling dehumidifier in a flow direction of a fluid, each of the plurality of cells including an air portion, a low temperature fluid portion, and a heat transfer tube portion provided between the air portion and the low temperature fluid portion and wherein the apparatus further comprises:

(g) calculation means for calculating temperature and humidity of air, and temperature of the low temperature fluid at an inlet of the cooling dehumidifier, and for calculating a response of temperature and humidity of the air at an outlet of the cooling dehumidifier with respect to a flow rate of the low temperature fluid in the cooling dehumidifier, on the basis of heat balance and material balance of each of the plurality of cells, wherein a ratio $S_{hf}$ indicated in the following equation is used as a ratio of a heater amount used for a change in temperature and humidity, when air having temperature and humidity at the inlet of the cooling dehumidifier is changed to a saturating point of steam having temperature in a position adjacent to the inlet for the low temperature fluid, $S_{hf}$=a sensible heat/{the sensible heat+a latent heat}, and wherein the cooling dehumidifier control section controls the cooling dehumidifier so as to realize the setting humidity.

9. The temperature and humidity control apparatus of claim 1 wherein said cooling dehumidifier has a plurality of cells formed by dividing the cooling dehumidifier in a flow direction of a fluid, each of the plurality of cells including an air portion, a low temperature fluid portion, and a heat transfer tube portion provided between the air portion and the low temperature fluid portion and wherein the apparatus further comprises:

(g) calculation means for calculating temperature and humidity of air, and temperature of the low temperature fluid at an inlet of the cooling dehumidifier, and for calculating a response of temperature and humidity of the air at an outlet of the cooling dehumidifier with respect to a flow rate of the low temperature fluid in the cooling dehumidifier, on the basis of heat balance and material balance of each of the plurality of cells, wherein a coefficient of heat transfer in a wet condition of the heat transfer tube portion is corrected by a rate $S_{hf}$ indicated in the following equation, when air having temperature and humidity at the inlet of the cooling dehumidifier is changed to a saturating point of steam having temperature in a position adjacent to the inlet for the low temperature fluid, $S_{hf}$=a sensible heat/{the sensible heat+a latent heat}, and wherein the cooling dehumidifier control section controls the cooling dehumidifier so as to realize the setting humidity.

* * * * *